(12) United States Patent
Shigemi et al.

(10) Patent No.: US 7,103,571 B2
(45) Date of Patent: Sep. 5, 2006

(54) ELECTRONIC SETTLEMENT SYSTEM USING PREPAID TYPE ELECTRONIC MONEY

(75) Inventors: Kazuhiko Shigemi, Tokyo (JP); Shinobu Hasebe, Saitama (JP); Miwa Nishio, Saitama (JP); Hiroya Seshimo, Chiba (JP); Hiroyuki Hatanaka, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 708 days.

(21) Appl. No.: 10/058,312

(22) Filed: Jan. 30, 2002

(65) Prior Publication Data

US 2003/0004869 A1    Jan. 2, 2003

(30) Foreign Application Priority Data

Jun. 29, 2001 (JP) ............................. 2001-199028

(51) Int. Cl.
*G06Q 40/00* (2006.01)

(52) U.S. Cl. ..................... 705/39; 705/35; 705/40; 705/41

(58) Field of Classification Search .................. 705/35, 705/40–42, 44
See application file for complete search history.

(56) References Cited

U.S. PATENT DOCUMENTS

| | | | |
|---|---|---|---|
| 6,085,168 A * | 7/2000 | Mori et al. | 705/17 |
| 6,793,135 B1 * | 9/2004 | Ryoo | 235/383 |
| 2001/0013019 A1 * | 8/2001 | Sugiyama et al. | 705/41 |
| 2002/0016745 A1 * | 2/2002 | Kuwahara et al. | 705/26 |

* cited by examiner

*Primary Examiner*—Alan L. Bashore
(74) *Attorney, Agent, or Firm*—Rabin & Berdo, P.C.

(57) ABSTRACT

Even goods of a low price can be handled at a virtual shop and services to the user side are improved. When a payment instruction of certain goods is issued from a user's terminal 1, a paying method presenting unit (21) of a virtual shop (2) presents a paying method using a prepaid type electronic money by the sale on a network (6). When the payment instruction by the prepaid type electronic money is issued from the user's terminal, an electronic money purchasing unit (22) purchases the prepaid type electronic money by using a settlement unit on the network, subtracts a payment money amount of the goods from a money amount of the purchased prepaid type electronic money, and notifies the user's terminal of a balance.

9 Claims, 3 Drawing Sheets

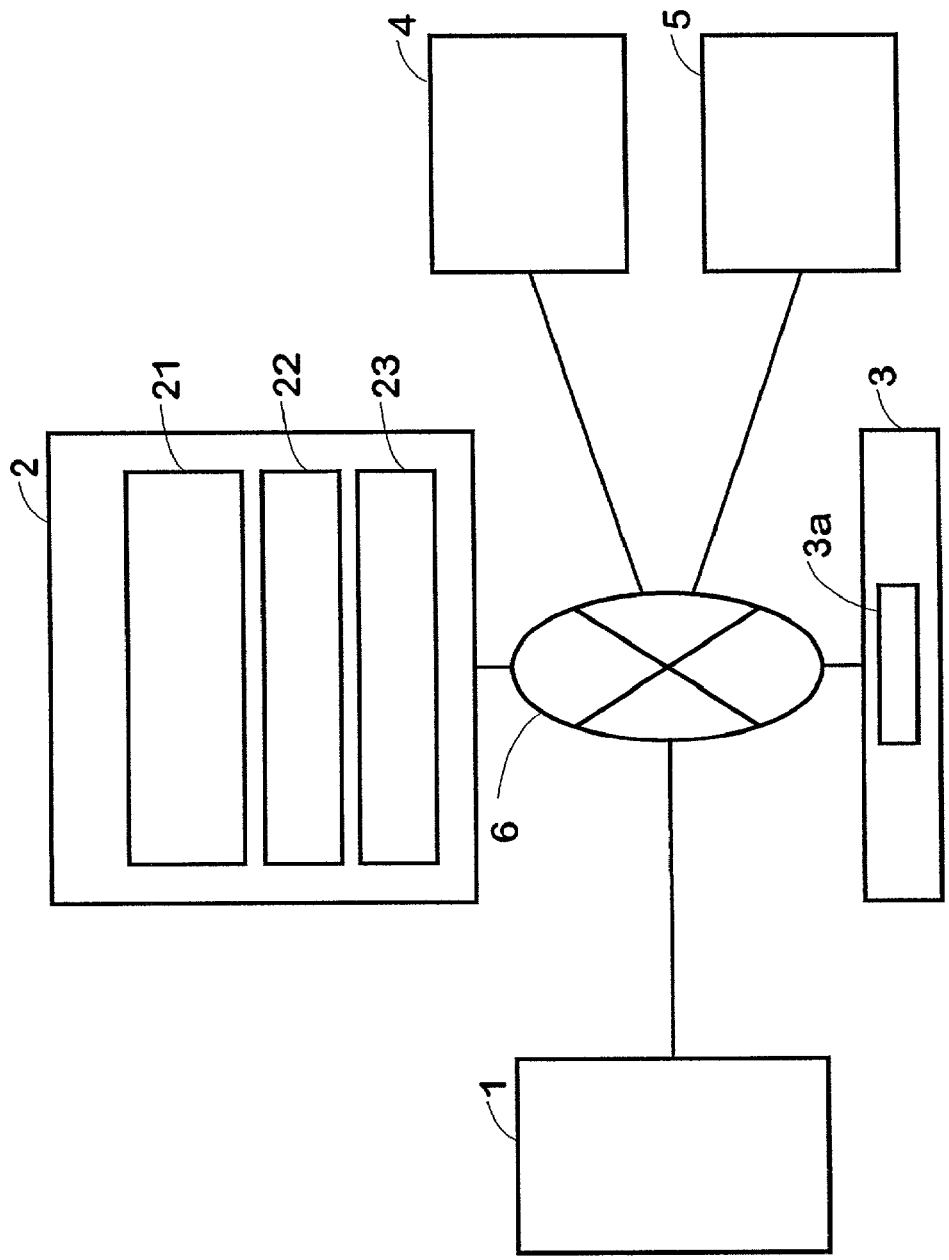

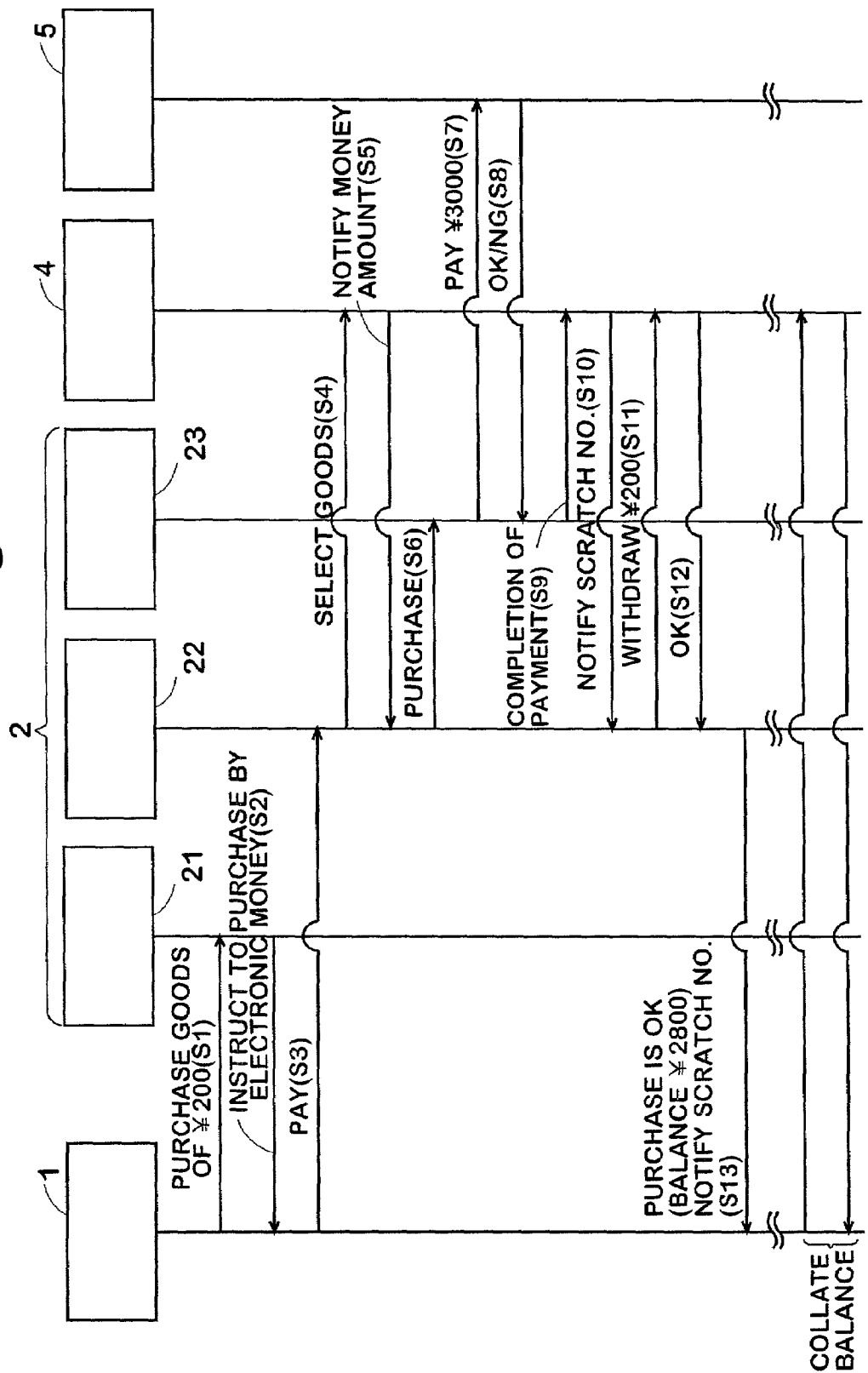

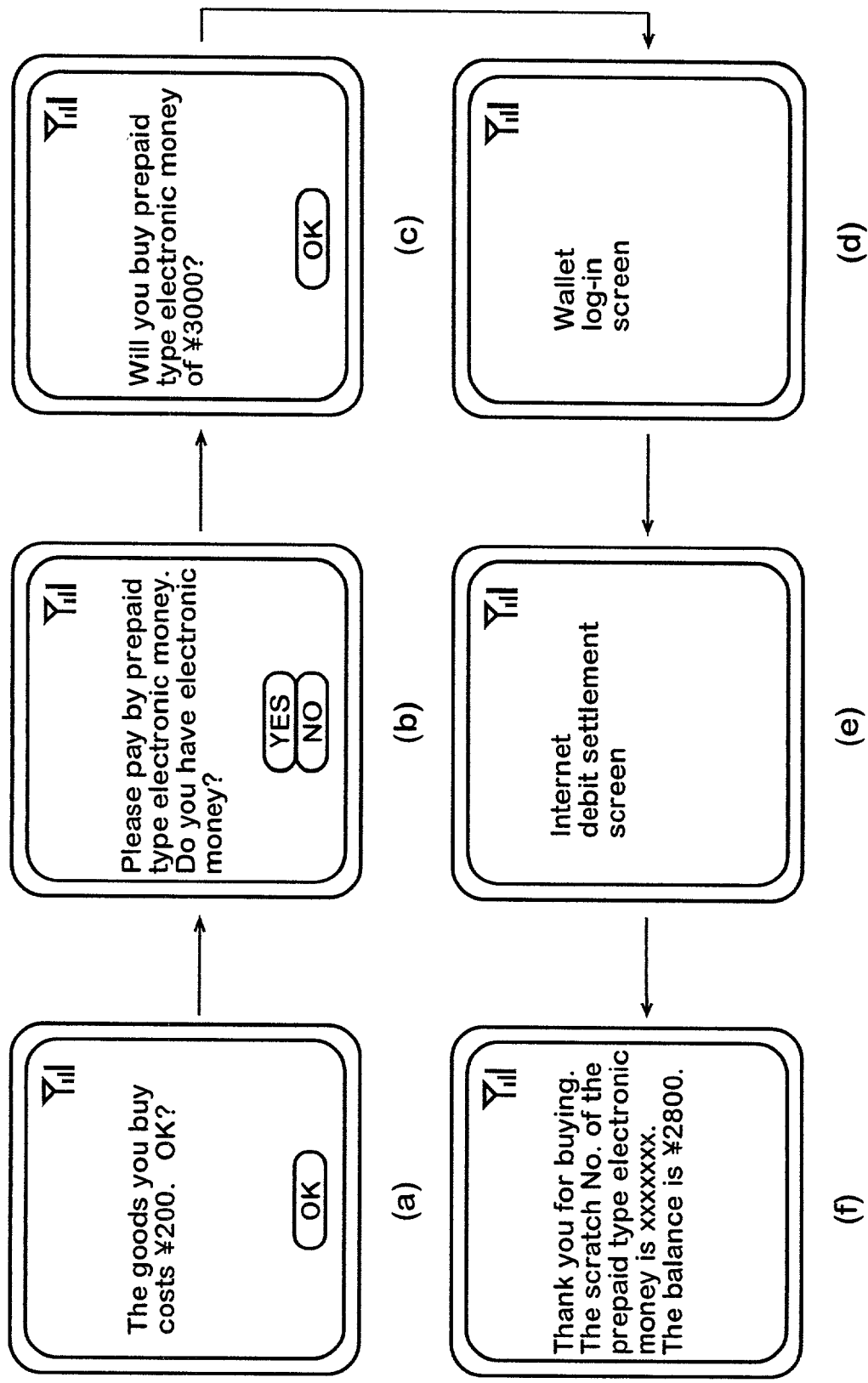

ELECTRONIC SETTLEMENT SYSTEM USING PREPAID TYPE ELECTRONIC MONEY

BACKGROUND OF THE INVENTION

1. Field of the Invention

The invention relates to an electronic settlement system and, more particularly, an electronic settlement system using prepaid type electronic money suitable for a settlement of a low price.

2. Related Background Art

A site for making a sale of digital contents such as distribution of music or an image on the Internet has appeared. According to such digital contents, a settlement money amount of one transaction is often small, for example, a settlement money amount of one download is equal to 200 yen. As settlement means on the Internet, there is an Internet debit settlement for making a real-time settlement on the Internet. However, according to such an Internet debit settlement, for example, as commission for one transaction below a certain transaction money amount, since a predetermined minimum charge is fixedly applied irrespective of the transaction money amount, it is unsuitable for goods of a low price.

Prepaid type electronic money which can be used in place of cash is used for settlement on the Internet. The prepaid type electronic money is, for example, a card of a certain money amount having a specific number (scratch number), and such a card is sold at a specific sale shop. The user purchases such a card and enters the scratch number as an identification number allocated to the card at the time of settlement on the Internet, thereby making a real-time settlement that is equivalent to payment by cash.

As mentioned above, at a virtual shop on the Internet, in case of the Internet debit settlement as its settlement method, it is difficult to handle goods of a low price because of the predetermined minimum charge of the commission. Even the settlement method by the prepaid type electronic money is not satisfactory in terms of a commission rate. This is because the commission rate of the prepaid type electronic money company cannot be suppressed due to an intermediate margin which is caused when the prepaid type electronic money is sold at a specific sale shop, a transport cost, a management cost for assuring security, or the like.

Also to the user side, since a degree of freedom of selection of goods is small because goods of a low price is not handled at the virtual shop or the like, the user hardly has strong desire to purchase many goods at the virtual shop. Further, even if the user wants to use the prepaid type electronic money on the Internet, he has to visit the specific sale shop, so that it is a very inconvenient method.

OBJECT AND SUMMARY OF THE INVENTION

It is, therefore, an object of the invention to provide an electronic settlement system which enables even goods of a low price to be handled at a virtual shop and can improve services to the user side.

To accomplish the above object, the present invention uses the following constructions.

According to the first aspect of the invention, there is provided an electronic settlement system for allowing payment for goods purchased by the user to be performed on a network from a virtual shop on the network via a terminal connected to the network, comprising:

a paying method presenting unit which, when a payment instruction from the user is received, presents a paying method using a prepaid type electronic money by a sale on the network to the user via the terminal;

a settlement unit which makes a settlement of a purchase charge of the prepaid type electronic money on the network; and an electronic money purchasing unit which, when the payment instruction by the prepaid type electronic money is received from the user via the terminal, purchases the prepaid type electronic money in place of the user on the network by the settlement in the settlement unit on the basis of the presentation of the paying method, and notifies the user of a balance of the prepaid type electronic money obtained by subtracting a payment money amount for the purchased goods from the purchased prepaid type electronic money and an identification number allocated to the prepaid type electronic money.

For example, a company and a settlement institution of the prepaid type electronic money are connected to the network, and the settlement unit purchases the prepaid type electronic money from the prepaid type electronic money company and makes a settlement of a payment charge of the prepaid type electronic money with the settlement institution.

The settlement unit makes the settlement in accordance with, for example, an SET (Secure Electronic Transactions).

For example, a wallet service providing company for providing a wallet serving as an electronic wallet is connected to the network, and the settlement unit makes the settlement by using the wallet.

The settlement is, for example, a debit settlement using the Internet.

The settlement is, for example, a credit settlement using the Internet.

The paying method presenting unit, electronic money purchasing unit, and settlement unit are provided for, for example, the virtual shop.

According to the second aspect of the invention, there is provided a control program for an electronic settlement in an electronic settlement system for allowing payment for goods purchased by the user to be performed on a network from a virtual shop on the network via a terminal connected to the network, wherein the control program allows a computer to execute:

a paying method presenting step which, when a payment instruction from the user is received, presents a paying method using a prepaid type electronic money by a sale on the network to the user via the terminal;

a settlement step which makes a settlement of a purchase charge of the prepaid type electronic money on the network; and an electronic money purchasing step which, when the payment instruction by the prepaid type electronic money is received from the user via the terminal, purchases the prepaid type electronic money in place of the user on the network by the settlement in the settlement step on the basis of the presentation of the paying method, and notifies the user of a balance of the prepaid type electronic money obtained by subtracting a payment money amount for the purchased goods from the purchased prepaid type electronic money and an identification number allocated to the prepaid type electronic money.

The above and other objects and features of the present invention will become apparent from the following detailed description and the appended claims with reference to the accompanying drawings.

BRIEF DESCRIPTION OF THE DRAWINGS

FIG. 1 is a constructional diagram of a prepaid type electronic money associated system according to an embodiment of the invention;

FIG. 2 is a sequence chart showing the operation of the embodiment of the invention;

FIG. 3 is an explanatory diagram of an example of a screen display of a user's terminal in the prepaid type electronic money associated system according to the embodiment of the invention.

DETAILED DESCRIPTION OF THE PREFERRED EMBODIMENT

An embodiment of the invention will be described in detail hereinbelow.

EMBODIMENT

<Construction>

FIG. 1 is a constructional diagram showing an embodiment of a prepaid type electronic money associated system according to the invention.

The system shown in the diagram comprises: a user 1; a virtual shop 2; a wallet service providing company 3; a prepaid type electronic money company 4; a settlement institution 5; and a network 6.

The user's terminal 1 comprises, for example, a cellular phone which can be connected to the network 6, a portable terminal called PDA (Personal Digital Assistants), a personal computer, or the like. The Web browser or the like for allowing the user to operate has been installed in the terminal 1.

The virtual shop 2 is a virtual shop existing on the network 6 and comprises a paying method presenting unit 21, an electronic money purchasing unit 22, and a settlement unit 23. When an instruction for payment for arbitrary goods is issued from the user's terminal 1, the paying method presenting unit 21 presents a paying method using a prepaid type electronic money by a sale on the network 6 to the user via the terminal 1 in response to the payment instruction. When a payment instruction of the prepaid type electronic money is issued from the user's terminal 1, the electronic money purchasing unit 22 purchases the prepaid type electronic money which is sold on the network 6 by the prepaid type electronic money company 4 by using a wallet 3a of the user 1 which is provided by the wallet service providing company 3 by the Internet debit settlement as a real-time settlement on the Internet. The electronic money purchasing unit 22 subtracts the money amount whose payment instruction has been received from the money amount of the purchased prepaid type electronic money and presents a resultant money amount to the user, that is, the user's terminal 1. The Internet debit settlement is made in accordance with a protocol called SET (Secure Electronic Transactions) for safely making the settlement on the Internet. This protocol defines specifications for making an electronic settlement by using the wallet 3a. As an Internet debit settlement based on the SET, for example, it is assumed that a real-time settlement unit such as an Interdebit proposed by JIPPA (Japan Internet Payment Promotion Association) is used. The settlement unit 23 makes a settlement of the prepaid type electronic money purchased by the user by using the electronic money purchasing unit 22.

Specifically speaking, the virtual shop 2 has, for example an electronic communicating apparatus having the following construction. That is, the electronic communicating apparatus comprises: a Web server which transmits and receives various data on the Internet; an AP (application) server having various application software for performing a commercial transaction on the Internet and databases such as goods database, customer database, order database, and the like; and a POS (point of sales) server which executes a settling process. Details of the those constructions are not shown in the diagram and are omitted here.

The paying method presenting unit 21 is realized by using the Web server. The electronic money purchasing unit 22 is realized by using the AP server. The settlement unit 23 is realized by the POS server. Further in detail, the paying method presenting unit 21, electronic money purchasing unit 22, and settlement unit 23 are realized by allowing a computer for each server to execute a control program corresponding to each unit.

The wallet service providing company 3 has a wallet server (not shown), provides the wallet 3a (wallet server function) having a function serving as a virtual electronic wallet on the network to the user's terminal 1, and provides a service regarding the settling process which is executed by the settlement institution 5 to the user.

The prepaid type electronic money company 4 is an industrial company for performing a sale, management, and operation of the prepaid type electronic money. The prepaid type electronic money company 4 has a contract of the Internet debit settlement with the wallet service providing company 3 and with the settlement institution 5.

The settlement institution 5 is a settlement institution such as financial institution like a bank or the like or credit card company and provides various settlement means such as account of the user or credit card. The network 6 is, for example, the Internet and is a network for mutually connecting the user's terminal 1, virtual shop 2, wallet service providing company 3, prepaid type electronic money company 4, and settlement institution 5.

<Operation>

The operation of the prepaid type electronic money associated system with the above construction will now De described.

The user preliminarily has, for example, his own account in the settlement institution 5 and makes a use contract of the Internet debit settlement by using the wallet 3a of the wallet service providing company 3.

FIG. 2 is a sequence chart showing the operation of the embodiment.

FIG. 3 shows an example of a display of a browser screen at the user's terminal 1.

First, the user views and selects the goods provided from the virtual shop 2 by using the Web browser by using the user's terminal 1. For example, the user purchases the goods which amounts to ¥200 and pays (step S1 in FIG. 2, (a) in FIG. 3). Thus, the paying method presenting unit 21 of the virtual shop 2 instructs to purchase the prepaid type electronic money (step S2). That is, as shown in (b) in FIG. 3, a message "Please pay by prepaid type electronic money. Do you have electronic money?" is displayed on the screen of the user's terminal 1. When the user does not have the prepaid type electronic money (that is, when "NO" is selected in (b) in FIG. 3), a message "Will you buy prepaid type electronic money of ¥3000?" is subsequently displayed (refer to (c) in FIG. 3).

Thus, when a payment instruction is issued from the user's terminal 1 to the electronic money purchasing unit 22 (step S3), the electronic money purchasing unit 22 purchases the prepaid type electronic money from the prepaid type electronic money company 4 by using the wallet 3a of the wallet service providing company 3 by the Internet debit settlement. First, the electronic money purchasing unit 22 selects the goods of the prepaid type electronic money which amounts to ¥3000 from the prepaid type electronic money company 4 (step S4). The money amount of the selected goods is notified by the prepaid type electronic money company 4 (step S5).

Consequently, the electronic money purchasing unit 22 issues a purchase instruction to the settlement unit 23 (step S6). At this time, the screen of the user's terminal 1 becomes a log-in screen of the wallet 3a (refer to (d) in FIG. 3). Further, by operating the wallet 3a (refer to (e) in FIG. 3), the settlement unit 23 instructs the settlement institution 5 to pay ¥3000 from the user's account to the account of the prepaid type electronic money company 4 (step S7). The settlement institution 5 notifies the settlement unit 23 of the completion of the payment if ¥3000 can be withdrawn from the user's account (step S8). By receiving such a notice, the settlement unit 23 notifies the prepaid type electronic money company 4 of the completion of the payment (step S9). Thus, the prepaid type electronic money company 4 notifies the electronic money purchasing unit 22 of the scratch number of the prepaid type electronic money of ¥3000 (step S10).

The electronic money purchasing process by the electronic money purchasing unit 22 in FIG. 2 is shown as a simplified form. Various contents are actually shown on the screen and data is transmitted and received to/from the user's terminal 1. However, since such a process is similar to the normal Internet debit settling process, their descriptions are omitted here. (d) in FIG. 3 shows various simplified screens regarding the settlement.

The electronic money purchasing unit 22 subsequently withdraws ¥200 from the prepaid type electronic money (step S11). In response to the withdrawal, when the electronic money purchasing unit 22 is notified of a permission by the prepaid type electronic money company 4 (step S12), the electronic money purchasing unit 22 notifies the user's terminal 1 of the completion of the payment for the goods, the balance of the prepaid type electronic money, and the scratch number of the prepaid type electronic money, respectively (step S13).

From such a viewpoint, even in the prepaid type electronic money company 4, (I) since the real-time settlement is possible, a diversity between income and expenses does not occur, so that the commission rate can be suppressed. (II) Since an online sale is performed, an intermediate margin and transport costs at the sale shop and costs necessary for keeping security of things like an actual card are hardly required. Therefore, the commission rate can be suppressed also from this point of view. Thus, the virtual shop 2 side can also sell goods of a low price by using the settlement by the prepaid type electronic money whose commission rate is.

When the user purchases goods again after that at the virtual shop 2, he can pay by the electronic money having the balance of ¥2800. At this time, in the payment by the prepaid type electronic money, if he selects an item showing that he has the prepaid type electronic money, the electronic money purchasing unit 22 executes the operations in step S11 and subsequent steps shown in FIG. 2.

When the user further collates the balance of the electronic money, he can log-in to a homepage of the prepaid type electronic money company 4 and collate the balance of his own prepaid type electronic money in a manner similar to an ordinary case.

<Effects>

As mentioned above, according to the embodiment, by receiving the instruction for payment for the goods purchased by the user, the paying method by the prepaid type electronic money is presented. When the user accepts the paying method, the prepaid type electronic money is purchased by the debit settlement on the network. The charge for the goods of the user is subtracted from the prepaid type electronic money. The user is notified of the balance of the prepaid type electronic money. Thus, the following effects are obtained on the user side and the virtual shop side.

[Effects on the User Side]

The user can purchase the prepaid type electronic money of the online sale by the Internet debit settlement.

The user can purchase even the goods of a low price from the virtual shop 2 on the network 6.

[Effects on the Virtual Shop Side]

The virtual shop 2 can use the debit settlement even for a sale of the goods of a low price such as digital contents or the like.

Thus, since the number of goods such as goods of a low price which can be handled increases, the electronic settlement can be used even in the industrial fields (for example, a virtual shop which mainly handles goods of a low price such as life convenience goods and stationery) in which it has been difficult to handle the electronic settlement hitherto. Even in the industrial field in which the electronic settlement has already been made, further more number of goods can be handled, so that it is possible to contribute to the improvement of a customer collecting rate and the increase in sales to the user side.

Since a variety of settlement units can be used, the services to the user side can be improved and the customer collecting rate can be improved also from this viewpoint.

<<Modification>>

The present system can be applied particularly to a sale of digital contents such as music, image, application program for a cellular phone, game, and online book. As industrial types at the virtual shop 2, the invention can be also applied to industrial types in which goods of a low price such as books, foods, life convenience goods, stationery, lottery, and other goods sales/services are handled.

In the embodiment, although the paying method presenting unit 21, electronic money purchasing unit 22, and settlement unit 23 have been installed it the virtual shop 2, the invention is not limited to such a construction. It is sufficient that each unit exists at any place on the network 6. For example, in place of installing the POS server into the virtual shop 2, a POS server similar to that mentioned above can be also installed in the wallet service providing company 3. The POS function on the virtual shop 2 side can be realized by the POS server installed in the wallet service providing company 3. In this case, the settlement unit 23 is installed in the wallet service providing company 3. In place of installing the electronic money purchasing unit 22 into the virtual shop 2, it can be also installed in the wallet service providing company 3.

In case of installing the POS server into the wallet service providing company 3, it is desirable that the settlement unit 23 is installed in the wallet service providing company 3 or the electronic money purchasing unit 22 is realized on the wallet service providing company 3 side.

In the embodiment, although the function for making the Internet debit settlement has been provided by the wallet service providing company 3, it is also possible to realize the settlement unit by preparing the wallet function on the user's terminal 1 side.

Further, in the embodiment, although the Internet debit settlement has been used as a settlement unit, other various settlements such as a credit settlement and the like which are made on the Internet can be also used.

In the embodiment, although the prepaid type electronic money company 4 exists independently, the virtual shop 2 can also function as a prepaid type electronic money company 4. It is assumed that the prepaid type electronic money by the online sale includes any form so long as it can perform payment similar to cash. For example, an electronic coupon ticket on the network 6 such that payment of a plurality of number of times is constructed as one set can be also included.

The present invention is not limited to the foregoing embodiment but many modifications and variations are possible within the spirit and scope of the appended claims of the invention.

What is claimed is:

1. An electronic settlement system for allowing payment for a purchase from a virtual shop on a network by a purchaser using a terminal connected to said network, comprising:

a paying method presenting unit means for receiving a verification from said terminal that said purchaser would like to make the purchase, sending a message to said terminal directing said purchaser to pay using prepaid electronic money and asking whether said purchaser already owns prepaid electronic money, and if said purchaser does not already own prepaid electronic money, sending an inquiry to said terminal asking whether said purchaser would like to buy a set amount of prepaid electronic money over said network;

a settlement unit means for making a settlement via said network for a purchase price when prepaid electronic money is bought on behalf of said purchaser; and an electronic money purchasing unit means for receiving an instruction to buy said set amount of prepaid electronic money from said purchaser via said terminal, purchasing said set amount of prepaid electronic money over said network on behalf of said purchaser aided by said settlement unit, and notifying said purchaser of an identification number allocated to the prepaid electronic money that has been purchased and reporting a balance remaining after payment for the purchase is subtracted from said set amount of prepaid electronic money.

2. A system according to claim 1, wherein a prepaid electronic, money company and a settlement institution of said prepaid electronic money are connected to said network, and said settlement unit means purchases said prepaid electronic money from said prepaid electronic money company and makes a settlement of a payment charge of said prepaid electronic money with said settlement institution.

3. A system according to claim 2, wherein said settlement unit means makes the settlement in accordance with an SET (Secure Electronic Transactions).

4. A system according to claim 3, wherein a wallet service providing company for providing an electronic wallet is connected to said network, and said settlement unit means makes the settlement by using said electronic wallet.

5. A system according to claim 4, wherein said settlement is a debit settlement using the Internet.

6. A system according to claim 4, wherein said settlement is a credit settlement using the Internet.

7. A system according to claim 1, wherein said paying method presenting unit means, said electronic money purchasing unit means, and said settlement unit means are provided for said virtual shop.

8. A computer readable medium that stores a control program for an electronic settlement in an electronic settlement system for allowing payment for a purchase from a virtual shop on a network by a purchaser using a terminal connected to said network, wherein said control program allows a computer to execute:

a paying method presenting step which, when said shop receives verification from said terminal that said purchaser would like to make the purchase, sends a message to said terminal directing said purchaser to pay using prepaid electronic money and asking whether said purchaser already owns prepaid electronic money, and if said purchaser does not already own prepaid electronic money, sending an inquiry to said terminal asking whether said purchaser would like to buy a set amount of prepaid electronic money over said network;

a settlement step which makes a settlement via said network for a purchase price when prepaid electronic money is bought on behalf of said purchaser; and an electronic money purchasing step which, when an instruction to buy said set amount of prepaid electronic money is received from said purchaser via said terminal, purchases said set amount of prepaid electronic money over said network on behalf of said purchaser in conjunction with said settlement step, and notifies said purchaser of an identification number allocated to the prepaid type electronic money that has been purchased and reports a balance remaining after payment for the purchase is subtracted from said set amount of prepaid electronic money.

9. A system according to claim 1, wherein the identification number is received by the electronic money purchasing unit means when the set amount of prepaid electronic money is purchased, and the electronic money purchasing unit means performs a subtraction operation on the basis of the identification number to determine the balance remaining.

* * * * *